United States Patent
Kim et al.

(10) Patent No.: US 10,506,550 B2
(45) Date of Patent: Dec. 10, 2019

(54) METHOD OF DELIVERING DOWNLINK SIGNALING AND DEVICE SUPPORTING THE SAME

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/653,041

(22) Filed: Jul. 18, 2017

(65) Prior Publication Data
US 2018/0027521 A1  Jan. 25, 2018

Related U.S. Application Data

(60) Provisional application No. 62/365,389, filed on Jul. 22, 2016, provisional application No. 62/413,485, filed on Oct. 27, 2016.

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC ........................... H04W 68/02; H04W 68/005
See application file for complete search history.

(56) References Cited

U.S. PATENT DOCUMENTS

| | | | |
|---|---|---|---|
| 8,938,266 B1* | 1/2015 | Goyal | H04W 68/06 455/458 |
| 2010/0195621 A1* | 8/2010 | Kekki | H04W 48/17 370/332 |
| 2012/0220214 A1* | 8/2012 | Du | H04B 7/15542 455/7 |
| 2013/0182677 A1* | 7/2013 | Frenger | H04W 68/02 370/329 |
| 2015/0215894 A1* | 7/2015 | Hayashi | H04W 68/02 455/458 |
| 2017/0078862 A1* | 3/2017 | Artuso | H04W 68/00 |

* cited by examiner

*Primary Examiner* — Mazda Sabouri
(74) *Attorney, Agent, or Firm* — Lee Hong Degerman Kang Waimey

(57) ABSTRACT

Provided are a method of delivering downlink signaling and a device supporting the method. According to one embodiment of the present invention, a method in which a first base station (BS) delivers downlink signaling to a user equipment (UE) in a wireless communication system includes: receiving the downlink signaling from an upper layer entity; requesting a second BS for paging on the UE; and delivering the downlink signaling to the UE via the second BS if a paging response of the UE is received from the second BS.

11 Claims, 8 Drawing Sheets

METHOD OF DELIVERING DOWNLINK SIGNALING AND DEVICE SUPPORTING THE SAME

CROSS-REFERENCE TO RELATED APPLICATIONS

Pursuant to 35 U.S.C. § 119(e), this application claims the benefit of U.S. Provisional Patent Application Nos. 62/365,389, filed on Jul. 22, 2016 and 62/413,485, filed on Oct. 27, 2016, the contents of which are all hereby incorporated by reference herein in their entirety.

BACKGROUND OF THE INVENTION

Field of the Invention

The present invention relates to a wireless communication system, and more particularly, to a method in which a base station (BS) delivers downlink signaling to a user equipment (UE) having mobility, and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, regarding a UE in a state where a core network is connected, a user plane path and a signaling path are established between an upper layer entity (e.g., an MME in LTE or a CP function in NR) and a base station (BS). In the absence of substantial data/signal transmission, the core network may remain in the connected state, and the UE enters an RRC_IDLE or RRC_INACTIVE state. In this case, a method in which the BS delivers the downlink signaling to the UE is discussed when downlink signaling is generated in the upper layer entity.

SUMMARY OF THE INVENTION

When a user equipment (UE) which has received a paging message transmitted from a base station (BS) performing buffering of signaling generated in an upper layer entity responds to a different BS, how the BS delivers the signaling to the different BS is problematic.

According to one embodiment of the present invention, a method in which a first BS delivers downlink signaling to a UE in a wireless communication system includes: receiving the downlink signaling from an upper layer entity; requesting a second BS for paging on the UE; and delivering the downlink signaling to the UE via the second BS if a paging response of the UE is received from the second BS.

The upper layer entity may be a mobility management entity (MME) or an access and mobility function (AMF) of a next generation core (NGC).

The requesting for the paging on the UE may include transmitting a paging message to the UE.

The method may further include performing buffering on the downlink signaling while waiting for the paging response from the UE.

The downlink signaling may be included in a non-access stratum (NAS) packet data unit (PDU).

The delivering of the downlink signaling to the UE via the second BS may include transmitting to the second BS a RETRIEVE UE CONTEXT RESPONSE message comprising the downlink signaling.

In the delivering of the downlink signaling to the UE via the second BS, the downlink signaling may be delivered to the UE through an X2 interface or NG4 interface between the first BS and the second BS.

In the receiving of the downlink signaling from the upper layer entity, the downlink signaling may be received through an S1 interface or NG2 interface between the first BS and the upper layer entity.

According to another embodiment of the present invention, a first BS for delivering downlink signaling to a UE in a wireless communication system includes: a memory; a transceiver; and a processor for operatively coupling the memory and the transceiver, wherein the processor is configured to: receive the downlink signaling from an upper layer entity; request a second BS for paging on the UE; and deliver the downlink signaling to the UE via the second BS if a paging response of the UE is received from the second BS.

The upper layer entity may be an MME or an AMF of an NGC.

The processor may be configured to transmit a paging message to the UE.

The processor may be configured to perform buffering on the downlink signaling while waiting for the paging response from the UE.

The downlink signaling may be included in an NAS PDU.

Even if a UE in an RRC_IDLE or RRC_INACTIVE state has mobility, a BS may easily deliver downlink signaling to the UE through data delivery with respect to another BS.

The processor may be configured to deliver the downlink signaling to the UE via the second BS by transmitting to the second BS a RETRIEVE UE CONTEXT RESPONSE message comprising the downlink signaling.

The processor may be configured to deliver the downlink signaling to the UE through an X2 interface or NG4 interface between the first BS and the second BS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
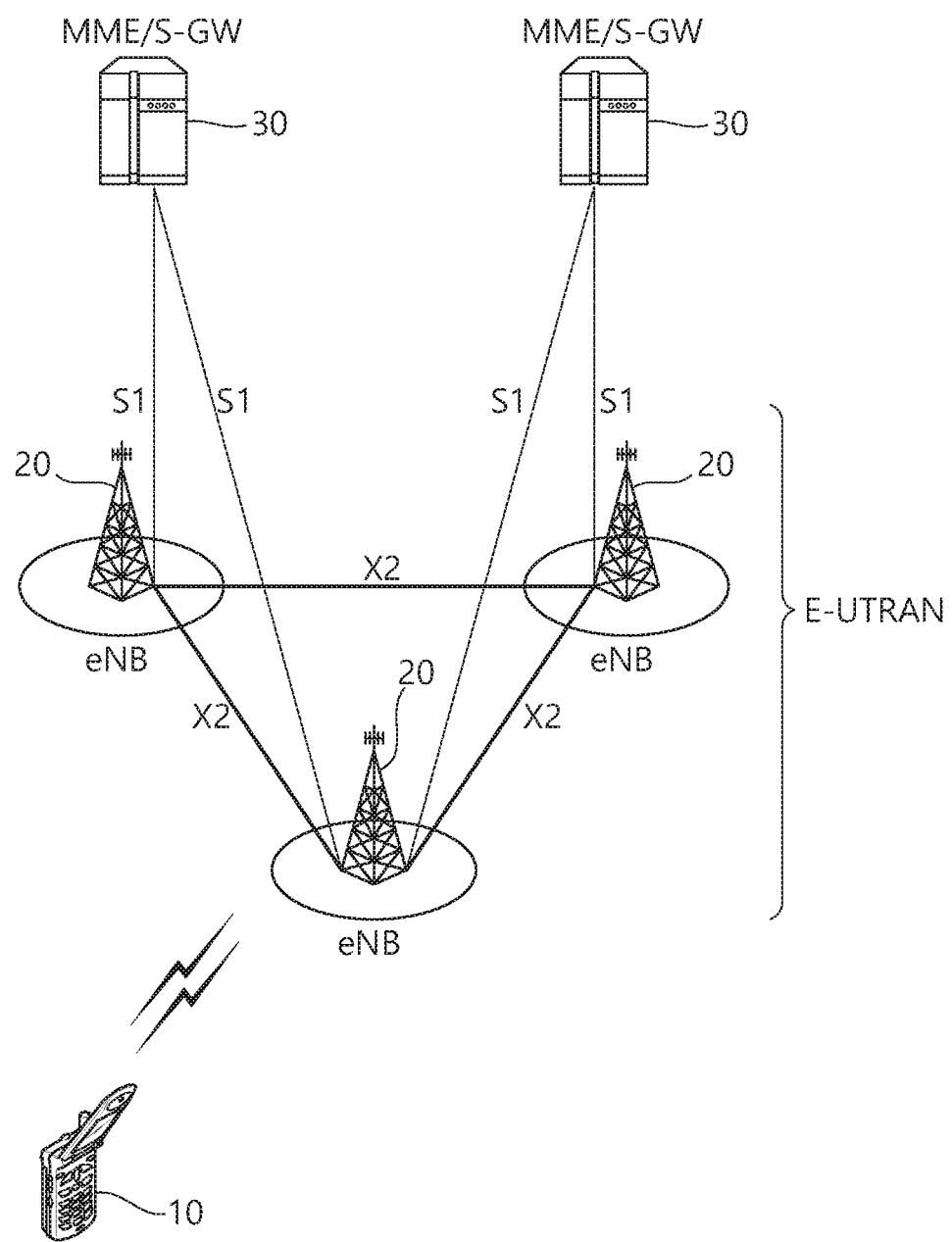
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
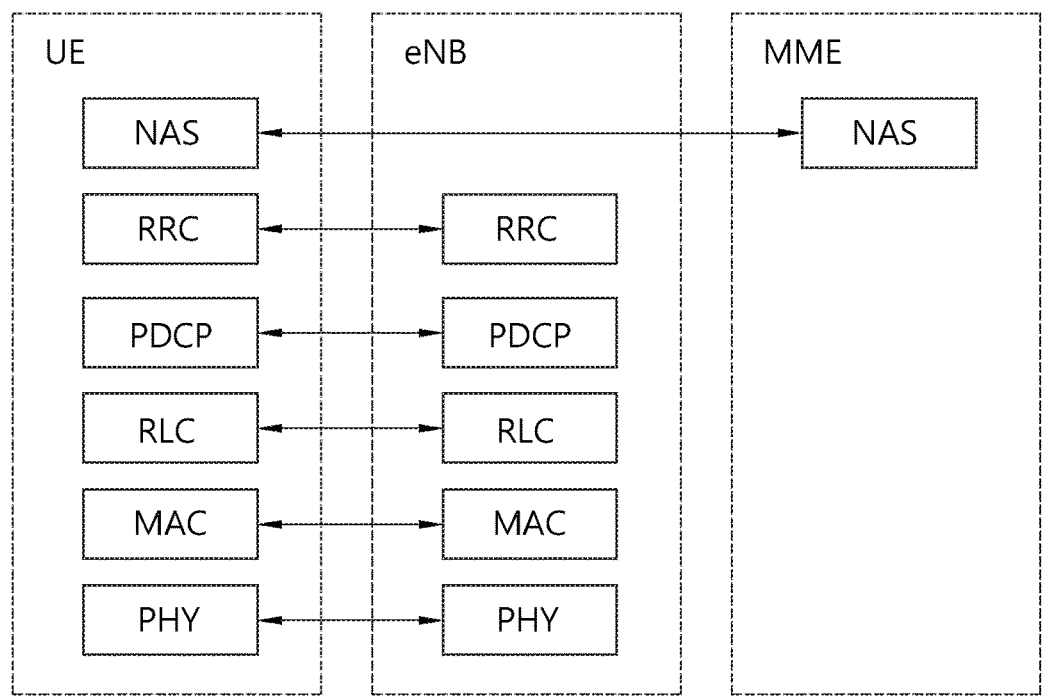
FIG. 2 shows a block diagram of a control plane protocol stack of an LTE system.
Figure 3:
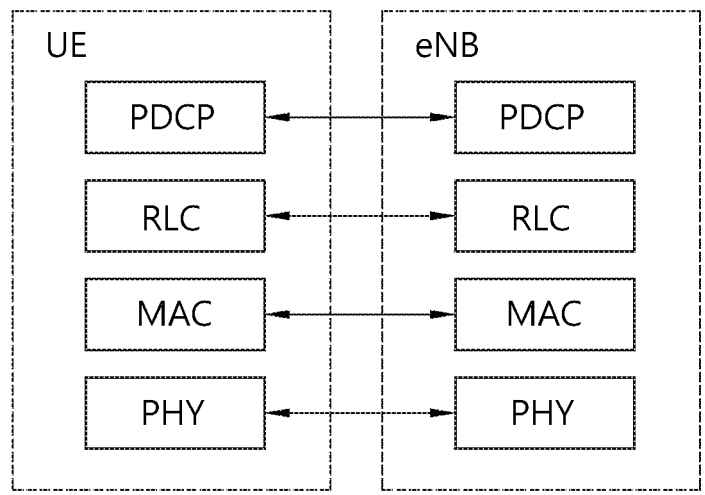
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G Network Structure is Described.

Figure 4:
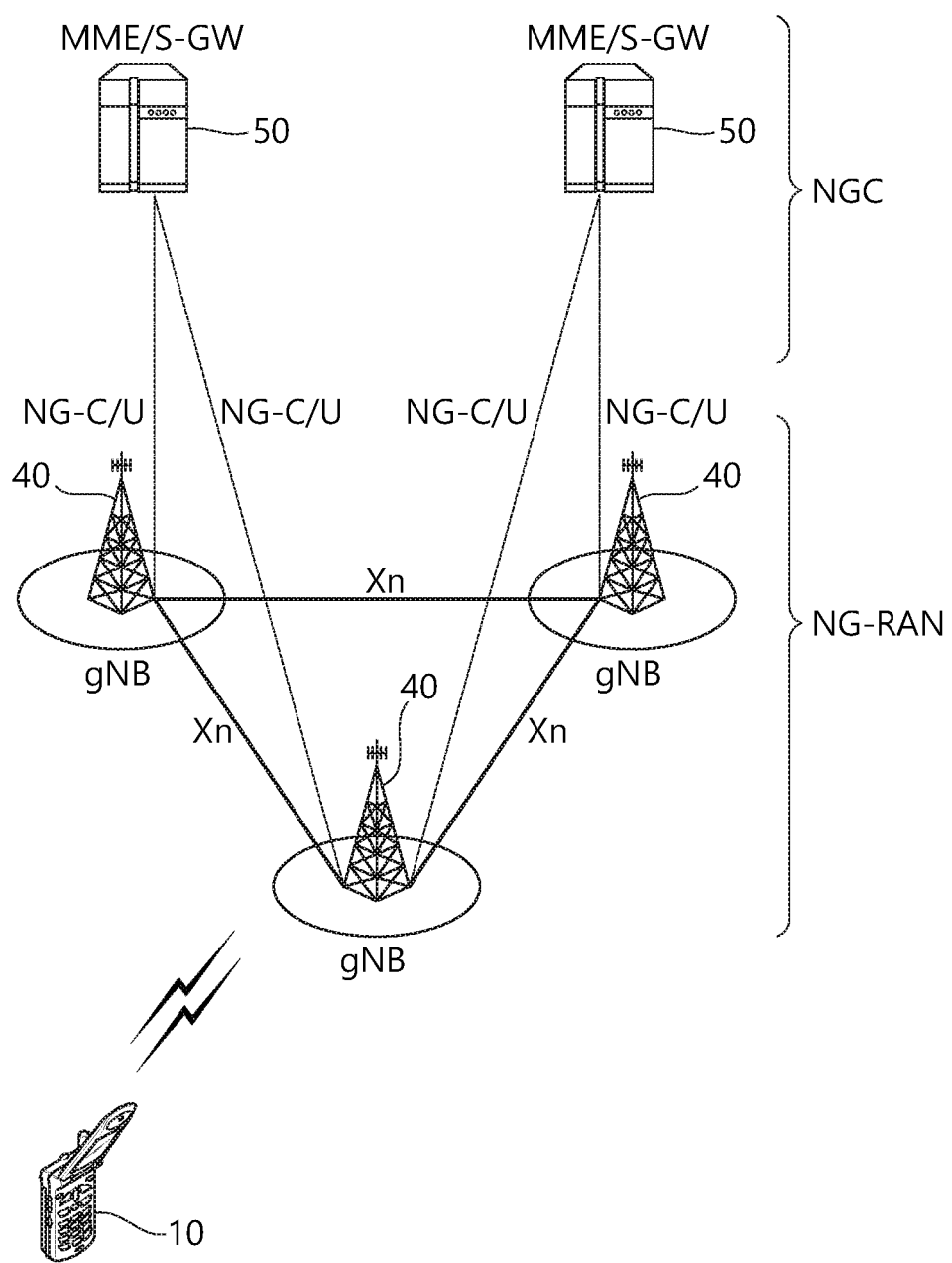
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

In case of a UE in a lightly connected mode, an MME may maintain an S1 connection of the activated UE to hide mobility and state transitions from a core network. In other words, in case of a UE in the RRC_INACTIVE state, an AMF may maintain an NG2 connection of the activated UE to hide mobility and state transitions from a next generation core (NGC). Meanwhile, in the present description, a next generation (NexGen) core CP function or a CP function refers to the AMF.

Meanwhile, regarding a UE in a state where the core network is connected, a user plane path and a signaling path are established between an upper layer entity (e.g., an MME in LTE or a CP function in NR) and a BS (RAN of LTE or NR). In the absence of substantial data/signal transmission, the core network may remain in the connected state, and the UE enters an RRC_IDLE or RRC_INACTIVE state. Since the S1/NG2 connection to the UE is still maintained, the upper layer entity cannot know an actual RAN state of the UE.

Figure 5:
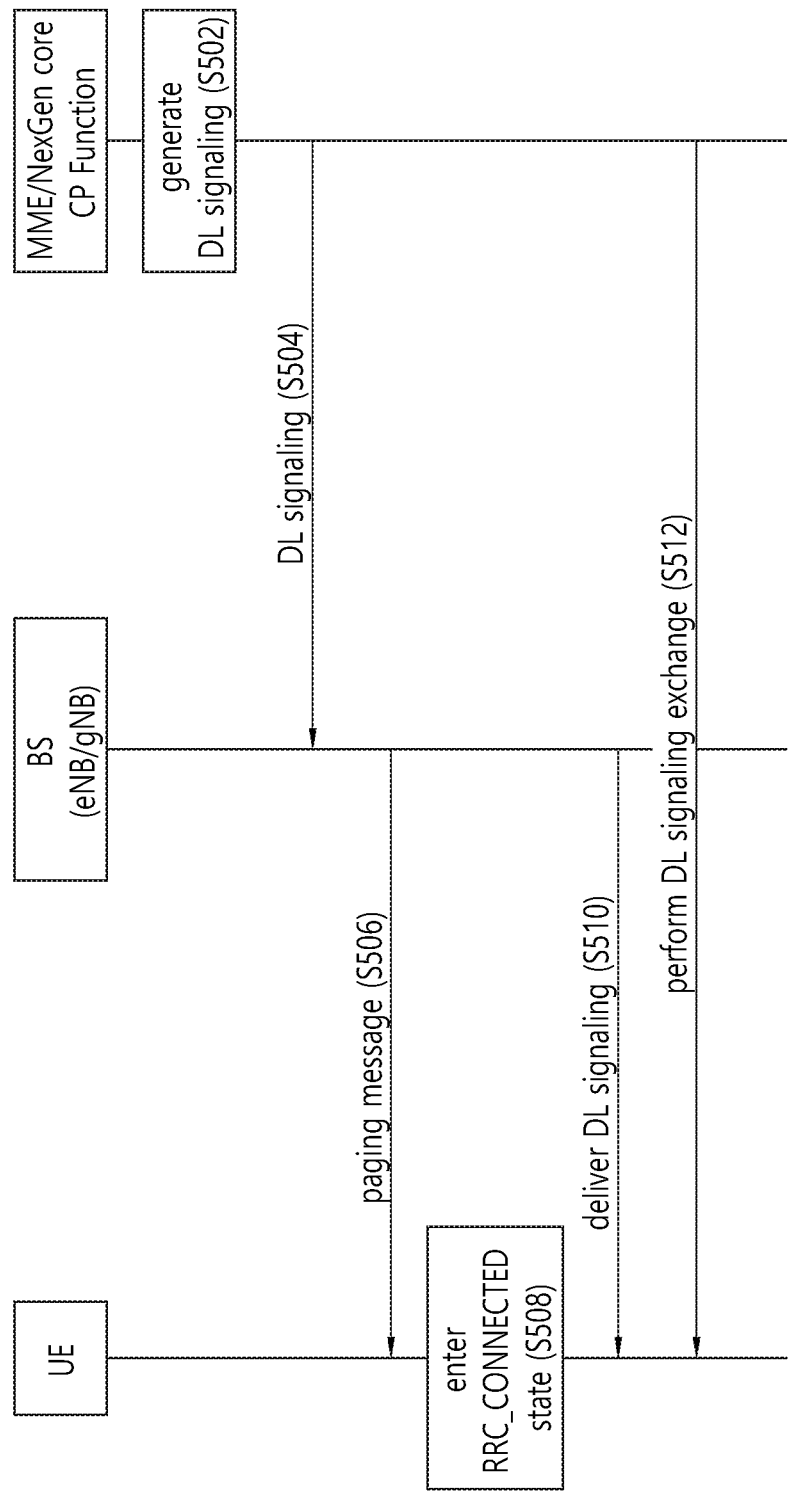
FIG. 5 is a flowchart illustrating a method of delivering downlink signaling.

FIG. 5 is a flowchart illustrating a method of delivering downlink signaling.

Referring to FIG. 5, new downlink signaling may be generated in an upper layer entity (S502). Herein, the upper layer entity may be an MME of LTE or a CP function (or AMF) of NR.

If the downlink signaling is generated, a UE may be in a state where a core network is connected, that is, in an RRC_INACTIVE state or a lightly connected state, and thus the upper layer entity may transmit the signaling to a BS (S504). Herein, the BS may be an RAN of LTE or NR.

The BS may perform buffering on the signaling received from the upper layer entity, and may broadcast a paging message to the UE to allow the UE to transition to an RRC_CONNECTED state (S506). Accordingly, the UE may enter an RRC_CONNECTED state (S508).

When the UE enters the RRC_CONNECTED state by receiving the paging message, the BS may deliver the buffered signaling to the UE (S510). Accordingly, the signaling may be exchanged between the upper layer entity and the UE (S512).

However, there is a discussion as to how the BS efficiently broadcasts the paging message to the UE. In addition, when the UE which has received the paging message transmitted from the BS performing the buffering of the signaling generated in the upper layer entity responds to a different BS, how the BS delivers the signaling to the different BS through the X2/NG4 interface is problematic. Hereinafter, the present invention proposes a method for solving the aforementioned problem.

In the present description, a gNB refers to a BS in NR, and an NG1 refers to an interface between a UE and a CP function of NR. In addition, an NG2 refers to an interface between the gNB and the CP function of NR, an NG3 refers to an interface between the UE and the gNB, and an NG4 refers to an interface between the gNBs. In addition, in the present description, an L-ID (e.g., a resume ID of Release 13) is for identifying which gNB stores UE context of the UE, and may be assigned to the UE by the gNB. However, these terms are distinguished by the aforementioned operations and functions, and may be changed optionally.

Figure 6:
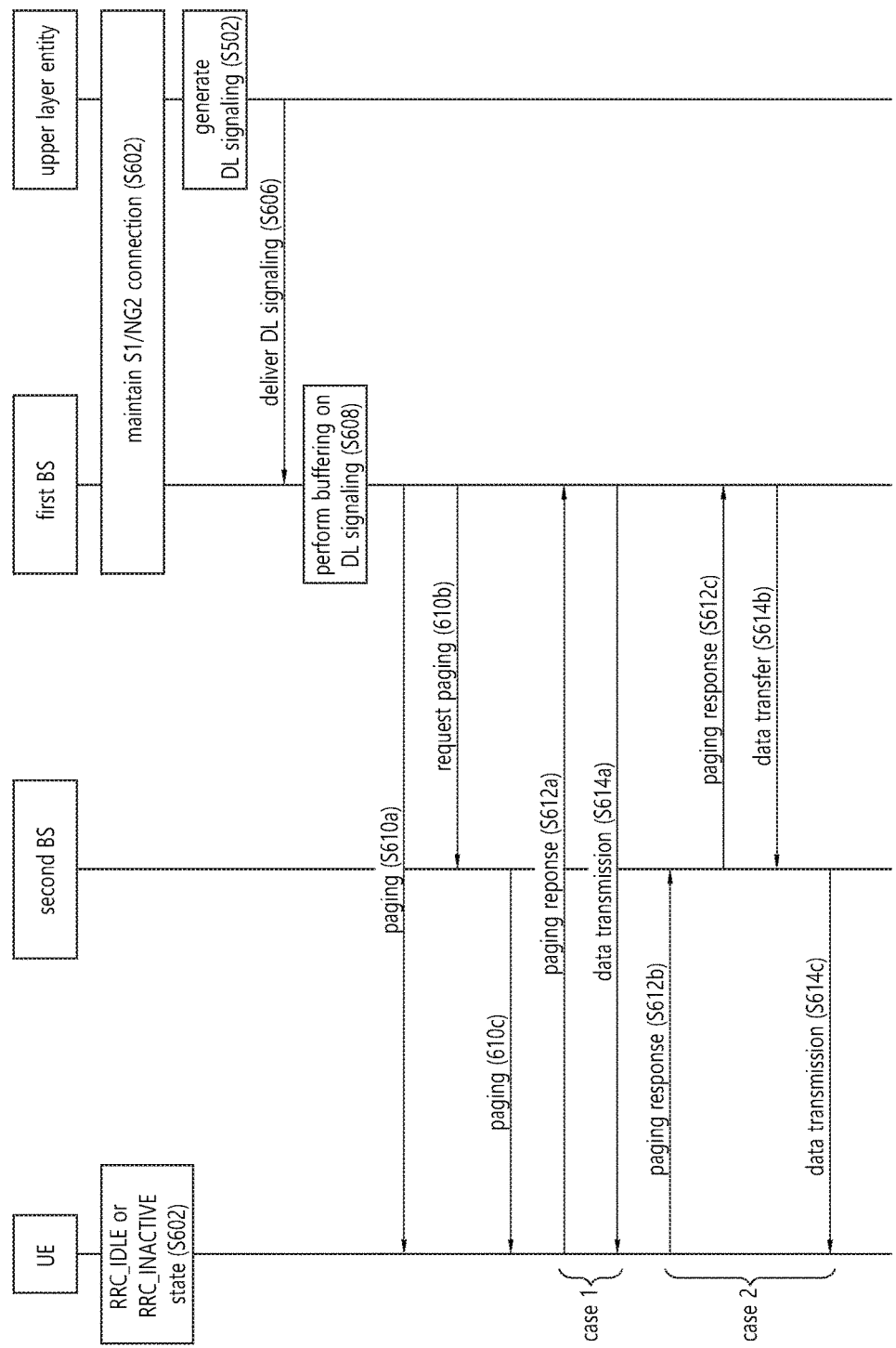
FIG. 6 is a flowchart illustrating a method of delivering downlink signaling according to an embodiment of the present invention.

FIG. 6 is a flowchart illustrating a method of delivering downlink signaling according to an embodiment of the present invention. The present embodiment relates to a method of efficiently broadcasting a paging message by a BS and a method of delivering signaling through an X2/NG4 interface. In the present embodiment, a BS corresponding to a coverage in which the UE was previously located may be defined as a first BS, and a BS corresponding to a coverage in which the UE is currently located may be defined as a second BS. Accordingly, the first BS may mean a BS which receives downlink signaling from an upper layer entity, and the second BS may mean a BS which delivers downlink signaling to the UE. However, the distinction between the first BS and the second BS is a merely functional classification for the same UE.

When the UE is in the RRC_IDLE or RRC_INACTIVE state, it is assumed as a state where connection between the first BS (eNB or gNB) and the upper layer entity (MME or CP function), that is, an S1/NG2 connection, is maintained (S602). However, the upper layer entity may recognize, or may not recognize, an actual RRC state of the UE.

Downlink signaling to be transmitted to the UE may be generated in the upper layer entity (S604). The downlink signaling may be downlink (DL) NAS/NG1 signaling.

The upper layer entity may transmit a DL NAS transmission message or a new type of message to the first BS together with an NAS-PDU including the DL NAS/NG1 signaling (S606). The DL NAS transmission message or the new type of message may include at least one of the following information in addition to the NAS-PDU including the DL NAS/NG1 signaling.

UE temporary ID
eNB UE S1 AP ID/gNB UE CP NG2AP ID
MME UE S1 AP ID/5G core UE CP NG2 AP ID
paging DRX
information regarding recommended cells and/or BSs The UE temporary ID for identifying UE context in a network is delivered to the UE. This message may include a paging DRX for efficiently broadcasting RAN paging and information regarding a recommended cell and/or BS.

The first BS may first perform buffering on DL NAS/NG1 signaling after receiving a message from the upper layer entity (S608). If the information regarding the recommended cell and/or BS is included, the first BS is able to restrict a paging area to a cell or BS indicated by this information, and thus the BS can save a paging resource usage amount.

Since the UE is in the RRC_IDLE or the RRC_INACTIVE state, the first BS may determine to trigger an RAN paging procedure so that the UE enters an RRC_CONNECTED state.

First, the first BS may perform paging on a cell to which the UE belongs (S610a). However, since the UE may move from a coverage of the first BS to a coverage of the second BS (eNB or gNB), even if the first BS transmits a paging message to a UE located in the coverage of the second BS, the first BS may not receive a response for the paging from the BS. Therefore, the first BS may transmit a paging request message to the second BS through an X2/NG4 interface. In other words, the first BS corresponding to the coverage in which the UE was located may request the second BS corresponding to the coverage in which the UE is currently located to perform paging on the UE through the X2/NG4. In this case, in order to support efficient broadcasting of RAN paging, the second BS may allow an X2/NG4 paging request message to include at least one of an L-ID, a UE temporary ID, a paging DRX, and information on recommended cells and/or BSs. Thereafter, the second BS may broadcast the paging message to the UE through a Uu/NG3 interface (S610c).

If the UE is present in the coverage of the first BS (case 1), the UE may respond to the first BS for the paging (S612a). However, if the UE is accessible to the second BS instead of the first BS (case 2), the UE may respond to the second BS for the paging (S612b). Specifically, the first BS may request a neighbor BS of the first BS for the paging, and the BS which has received a paging response from the UE among the BSs which have received the paging request may deliver the response to the first BS. In the present embodiment, the BS which has received the paging response from the UE is referred to as the second BS. In this case, the second BS may transmit an X2/NG4 paging response message to the first BS to inform that the UE is located in an area managed by the second BS (S612c). Meanwhile, according to another embodiment, when the UE responds to the second BS, the second BS may determine to retrieve UE context from the first BS by using the existing 'retrieve UE context procedure' or a new procedure through an X2/NG4 interface. Accordingly, the second BS may inform the first BS that the UE is located in an area managed by the second BS through a RETRIEVE UE CONTEXT REQUEST message or a new message.

If the first BS receives the paging response from the UE in step S612a, the first BS may directly transmit DL NAS/NG1 signaling to the UE (S614a). Meanwhile, if the second BS is accessible to the UE, the first BS may determine to transmit buffered DL NAS/NG1 signaling to the second BS. An X2/NG4 data transmission message may be transmitted to the second BS together with an NAS-PDU including the DL NAS/NG1 signaling (S614b). Thereafter, the second BS may forward downlink signaling to the UE (S614c). Meanwhile, according to another embodiment, if the second BS is accessible to the UE, the first BS may deliver UE context to the second BS through a RETRIEVE UE CONTEXT RESPONSE message or a new message through an X2/NG4 interface. Accordingly, the NAS-PDU including the DL NAS/NG1 signaling may also be included in this message and thus may be transmitted to the UE via the second BS. Thereafter, the second BS may forward the downlink signaling to the UE.

Figure 7:
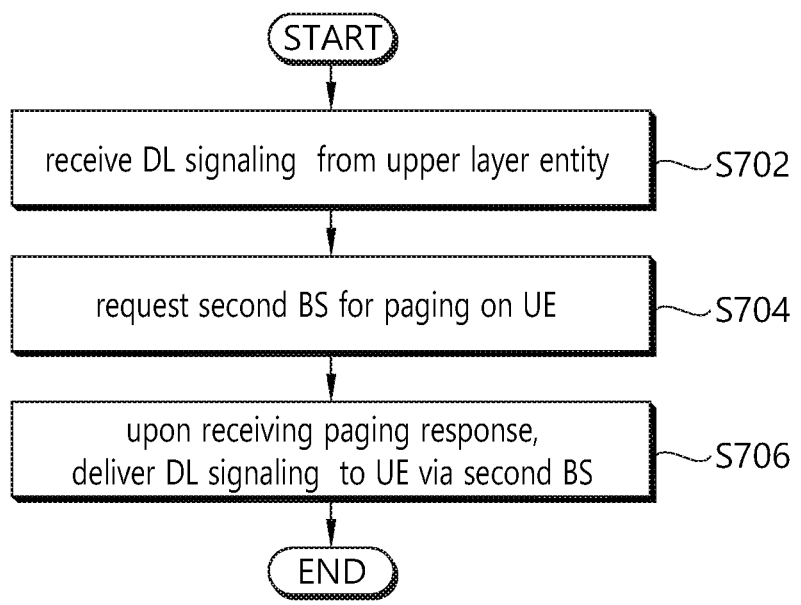
FIG. 7 is a flowchart illustrating a method of delivering downlink signaling according to an embodiment of the present invention.

FIG. 7 is a flowchart illustrating a method of delivering downlink signaling according to an embodiment of the present invention. In the present embodiment, it is assumed that a connection between a BS (eNB or gNB) and an upper layer entity (MME or CP function), that is, an S1/NG2 connection, is maintained when a UE is in an RRC_IDLE or RRC_INACTIVE state.

In addition, a BS corresponding to a coverage in which the UE was previously located may be defined as a first BS, and a BS corresponding to a coverage in which the UE is currently located may be defined as a second BS. Accordingly, the first BS may mean a BS which receives downlink signaling from the upper layer entity, and the second BS may mean a BS which delivers downlink signaling to the UE. However, the distinction between the first BS and the second BS is a merely functional classification for the same UE. The first BS and the second BS may be an eNB or a gNB.

The first BS may receive the downlink signaling from the upper layer entity (S702). Herein, the upper layer entity may be a mobility management entity (MME) or an access and mobility function (AMP) of a next generation core (NGC). However, in the present description, the AMP may be referred to as a NexGen core CP function or a CP function. In addition, the first BS may receive the downlink signaling from the upper layer entity through an S1 interface or an NG2 interface.

Meanwhile, the downlink signaling delivered from the upper layer entity to the first BS may be DL NAS/NG1 signaling, and may be included in an NAS-PDU. In addition, the downlink signaling may include at least one of the following information.

UE temporary ID
eNB UE S1 AP ID/gNB UE CP NG2AP ID
MME UE S1 AP ID/5G core UE CP NG2 AP ID
paging DRX
information regarding recommended cells and/or BSs The first BS may request the second BS, corresponding to a coverage in which the UE is located, for paging on the UE (S704). Specifically, the first BS may perform buffering on downlink signaling while waiting for the paging response from the UE, and may calculate a paging area. Thereafter, the first BS may transmit a paging message to the UE. That is, the first BS may directly transmit the paging message to the UE through a Uu interface or an NG3 interface. Further, the first BS may request the second BS for the paging on the UE. That is, the first BS may request the second BS for the paging on the UE, regardless of whether the first BS receive response to the paging message from UE directly. The UE is located in a coverage of the first BS and then moves to a coverage of the second BS, the first BS may request the second BS to perform the paging on the UE. The first BS may request the second BS for the paging through an X2 interface or an NG4 interface, and a paging request message may include an L-ID, a UE temporary ID, a paging DRX, and information on recommended cells and/or BSs.

Upon receiving the paging request message from the first BS, the second BS may perform paging on the UE. Specifically, the second BS may transmit a paging message to the UE through a Uu interface or an NG3 interface. The UE may transmit a paging response to the second BS in response to the paging message. The paging response may also be transmitted to the second BS through the Uu interface or the NG3 interface.

Since the paging response for the UE is received from the second BS, the first BS may deliver the downlink signaling to the UE via the second BS (S706). Specifically, if the paging response of the UE is received from the second BS, the first BS may deliver the downlink signaling to the second BS. Then, the second BS may receive the downlink signaling and transmit it to the UE. In this case, data delivery between the first BS and the second BS may be performed through an X2 interface or an NG4 interface. In addition, the downlink signaling to be delivered via the second BS may include an NAS-PDU.

According to another embodiment, the second BS which has received the paging response from the UE may request the first BS to retrieve UE context, and the first BS may deliver the downlink signaling to the second BS in response to the RETRIEVE UE CONTEXT REQUEST.

Figure 8:
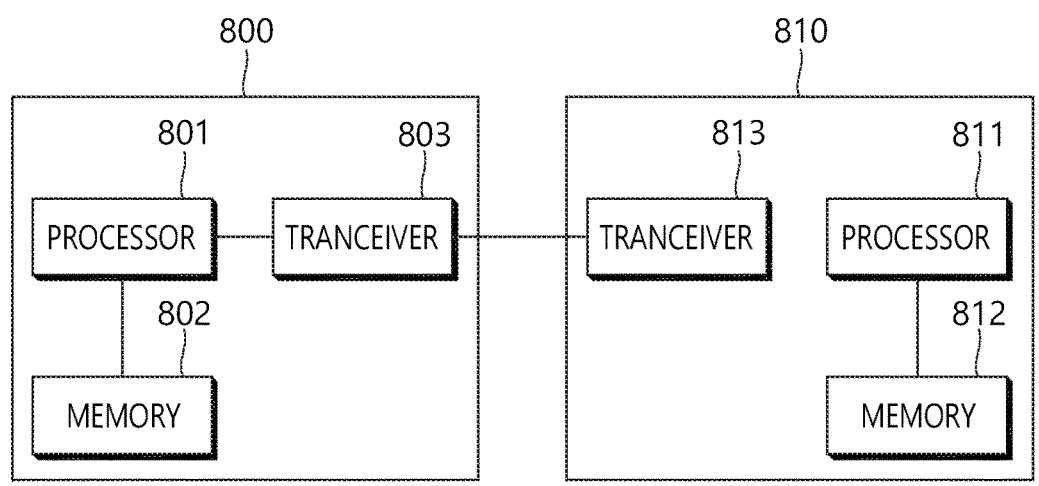
FIG. 8 shows a communication system to implement an embodiment of the present invention.

FIG. 8 shows a communication system to implement an embodiment of the present invention.

A first network node 800 includes a processor 801, a memory 802, and a transceiver 803. The memory 802 is coupled to the processor 801, and stores a variety of information for driving the processor 801. The transceiver 803 is coupled to the processor 801, and transmits and/or receives a radio signal. The processor 801 implements the proposed functions, procedures, and/or methods. In the aforementioned embodiments, an operation of the first network node may be implemented by the processor 801.

A second network node 810 includes a processor 811, a memory 812, and a transceiver 813. The memory 812 is coupled to the processor 811, and stores a variety of information for driving the processor 811. The transceiver 813 is coupled to the processor 811, and transmits and/or receives a radio signal. The processor 811 implements the proposed functions, procedures, and/or methods. In the aforementioned embodiments, an operation of the second network node 810 may be implemented by the processor 811.

The processors 811 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting downlink (DL) signaling to a user equipment (UE) in a wireless communication system, the method performed by a first base station (BS) and comprising:
   receiving downlink (DL) signaling from an upper layer entity, the DL signaling including information related to candidate BSs recommended by the upper layer entity;
   buffering the received DL signaling until a paging response is received from a user equipment (UE);
   transmitting a first paging message to the UE when the UE is in a radio resource control (RRC) inactive state;
   transmitting a request message requesting a second BS that is one of the candidate BSs to transmit a second paging message to the UE,
   wherein the request message includes identity (ID) of the first BS which stores UE context of the UE;
   when a second response message in response to the second paging message is received earlier from the second BS than a first response message in response to the first paging message, forwarding the buffered DL signaling to the second BS; and
   when the first response message is received earlier than the second response message, transmitting the buffered DL signaling to the UE,
   wherein the second BS transmits the second response message to the first BS based on the ID of the first BS included in the request message, when the second BS receives the first paging response in response to the first paging message.

2. The method of claim 1, wherein the upper layer entity is a mobility management entity (MME) or an access and mobility function (AMF) of a next generation core (NGC).

3. The method of claim 1, wherein the received DL signaling is included in a non-access stratum (NAS) packet data unit (PDU).

4. The method of claim 1, wherein the buffered DL signaling is transmitted to the UE via an X2 interface or an NG4 interface between the first BS and the second BS.

5. The method of claim 1, wherein the DL signaling is received via an S1 interface or an NG2 interface between the first BS and the upper layer entity.

6. A first base station (BS) for delivering downlink (DL) signaling to a user equipment (UE) in a wireless communication system, the BS comprising:
   a memory configured to store information;

a transceiver configured to transmit and receive information; and a processor operatively coupled to the memory and the transceiver and configured to:

control the transceiver to receive downlink (DL) signaling from an upper layer entity, the DL signaling including information related to candidate BSs recommended by the upper layer entity;

buffering the received DL signaling until a paging response is received from a user equipment (UE);

control the transceiver to transmit a first paging message to the UE when the UE is in a radio resource control (RRC) inactive state;

control the transceiver to transmit a request message requesting a second BS that is one of the candidate BSs to transmit a second paging message to the UE, wherein the request message includes identity (ID) of the first BS which stores UE context of the UE;

when a second response message in response to the second paging message is received earlier from the second BS than a first response message in response to the first paging message, control the transceiver to forward the buffered DL signaling to the second BS; and when the first response message is received earlier than the second response message, control the transceiver to transmit the buffered DL signaling to the UE, wherein the second BS transmits the second response message to the first BS based on the ID of the first BS included in the request message, when the second BS receives the first paging response in response to the first paging message.

7. The first BS of claim 6, wherein the upper layer entity is a mobility management entity (MME) or an access and mobility function (AMF) of a next generation core (NGC).

8. The first BS of claim 6, wherein the received DL signaling is included in a non-access stratum (NAS) packet data unit (PDU).

9. The first BS of claim 6, wherein transmitting the buffered DL signaling comprises controlling the transceiver to transmit a RETRIEVE UE CONTEXT RESPONSE message including the received DL signaling to the second BS.

10. The first BS of claim 6, wherein the received DL signaling is transmitted to the UE via an X2 interface or an NG4 interface between the first BS and the second BS.

11. The first BS of claim 6, wherein the DL signaling is received via an S1 interface or an NG2 interface between the first BS and the upper layer entity.

* * * * *